United States Patent
Cho et al.

(10) Patent No.: US 7,583,326 B2
(45) Date of Patent: Sep. 1, 2009

(54) LIGHT GUIDE PLATE AND LIQUID CRYSTAL DISPLAY HAVING THE SAME

(75) Inventors: Jong-Whan Cho, Ansan-si (KR); Sang-Jin Pak, Yongin-si (KR); Kee-Han Uh, Yongin-si (KR); Sang-Woo Park, Seoul (KR); Bang-Sil Choi, Seoul (KR); Jae-Ik Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/774,345

(22) Filed: Jul. 6, 2007

(65) Prior Publication Data

US 2008/0018812 A1    Jan. 24, 2008

(30) Foreign Application Priority Data

Aug. 16, 2006    (KR) .................. 10-2006-0076978

(51) Int. Cl.
G02F 1/1335    (2006.01)
(52) U.S. Cl. .......................................... 349/12
(58) Field of Classification Search ............ 349/12
See application file for complete search history.

(56) References Cited

U.S. PATENT DOCUMENTS

| 5,550,661 | A | 8/1996 | Clark et al. |
| 5,729,319 | A | 3/1998 | Inou et al. |
| 5,852,487 | A | 12/1998 | Fujimori et al. |
| 5,926,313 | A | 7/1999 | Hishinuma et al. |
| 6,097,460 | A | 8/2000 | Shimizu et al. |
| 6,570,707 | B1 | 5/2003 | Murakami et al. |
| 6,638,582 | B1 | 10/2003 | Uchiyama et al. |
| 6,771,327 | B2 * | 8/2004 | Sekiguchi .................. 349/12 |
| 6,881,453 | B2 | 4/2005 | Kido et al. |

FOREIGN PATENT DOCUMENTS

| EP | 1020755 | 7/2000 |
| EP | 1103885 | 5/2001 |
| KR | 1020010033970 | 4/2001 |
| KR | 1020010090961 | 10/2001 |
| WO | WO 0070550 | 11/2000 |

* cited by examiner

*Primary Examiner*—James A Dudek
(74) *Attorney, Agent, or Firm*—F. Chau & Assoc., LLC

(57) ABSTRACT

A liquid crystal display apparatus is disclosed. A first transparent electrode is disposed on an upper surface of the liquid crystal display panel for displaying an image. A second transparent electrode is disposed on a lower surface of a polarizer, and the second transparent electrode is opposite to the first transparent electrode. Accordingly, the entire thickness of the liquid crystal display apparatus may be decreased, and the manufacturing cost of the liquid crystal display apparatus may be reduced.

13 Claims, 16 Drawing Sheets (RELTED ART)

LIGHT GUIDE PLATE AND LIQUID CRYSTAL DISPLAY HAVING THE SAME

CROSS REFERENCE TO RELATED APPLICATIONS

This application is a continuation-in-part of application Ser. No. 10/525,060, filed on Feb. 18, 2005, which claims priority to Korean Patent Applications No. 2002-49272 filed on Aug. 20, 2002, No. 2002-49273 filed on Aug. 20, 2002, and No. 2002-68250 filed on Nov. 5, 2002, and also relies for priority upon Korean Patent Application No. 2006-76978 filed on Aug. 16, 2006, the disclosures of which are hereby incorporated herein by reference in their entireties.

TECHNICAL FIELD

The disclosure relates to a liquid crystal display (LCD) apparatus, and more particularly to a liquid crystal display apparatus having a touch panel.

BACKGROUND ART

A touch panel is a device for detecting a position of an object or a finger while the object or finger is touched on a point of the screen of a display device.

FIG. 1 is a cross sectional view showing a conventional liquid crystal display apparatus.

Referring to FIG. 1, the liquid crystal display apparatus includes a liquid crystal display panel 20 for displaying an image and a touch panel for detecting a position of an object that touches an outer surface of the touch panel.

The liquid crystal display panel 20 includes a thin film transistor (TFT) substrate 21, a color filter (C/F) substrate 23 and a liquid crystal layer 25 interposed between the TFT substrate 21 and the color filter substrate 23. A pixel electrode 22 is formed on an upper surface of the TFT substrate. The color filter substrate 23 faces the TFT substrate 21, an a common electrode 24 is formed on a lower surface of the color filter substrate.

A first polarizer 26 is formed on a lower surface of the TFT substrate 21, and a second polarizer 27 is formed on an upper surface of the color filter substrate 23.

The touch panel 30 includes a first substrate 31, a second substrate 34, a first transparent electrode 32 and a second transparent electrode 35. The second substrate is spaced apart from the first substrate by a predetermined distance. The first transparent electrode 32 is formed on an upper surface of the first substrate 31, and the second transparent electrodes 35 is formed on a lower surface of the second substrate 34. The upper surface of the first substrate 31 is opposite to the lower surface of the second substrate 34.

The first substrate 31 is comprised of a transparent material so that the light from the liquid crystal display panel may be transmitted through the first substrate 31. The second substrate 34 is comprised of an optical film having an isotropic refractivity.

The entire thickness of the liquid crystal display apparatus 10 is increased due to two substrates such as the color filter substrate 23 and the first substrate 31 disposed on both surfaces of the second polarizer 27.

In addition, loss of light is increased since the light incident into the liquid crystal display panel 20 and the light exiting from the liquid crystal display panel 20 pass through both color filter substrate 23 and first substrate 31.

DISCLOSURE OF THE INVENTION

Accordingly, the present invention is provided to substantially obviate one or more problems due tom limitations and disadvantages of the related art.

It is one feature of the present invention to provide a liquid crystal display apparatus having a reduced thickness and manufacturing cost.

According to an aspect of the present invention for achieving one feature of the present invention, there is provided a liquid crystal display apparatus comprising a liquid crystal display panel for displaying an image; and a touch panel including i) a first retardation member being disposed on an upper surface of the liquid crystal display panel, ii) a first transparent electrode disposed on the first retardation member iii) a second transparent electrode separated from the first transparent electrode by a predetermined distance, iv) a second retardation member disposed on the second transparent electrode, and v) a first polarizing member disposed on the second retardation member, and the touch panel detecting a point where the first transparent electrode is electrically connected to the second transparent electrode to detect a position of an object that touches an outer surface of the touch panel.

According to another aspect of the present invention for achieving the fifth feature of the preset invention, there is provided a liquid crystal display apparatus comprising: a liquid crystal display panel for displaying an image; and a touch panel including i) a first transparent electrode disposed on an upper surface of the liquid crystal display panel, ii) a second transparent electrode separated from the first transparent electrode by a predetermined distance, iii) a first retardation member disposed on the second transparent electrode, iv) a second retardation member disposed on the first retardation member, and v) a first polarizing member disposed on the second retardation member, and the touch panel detecting a point at which the first transparent electrode is electrically connected to the second transparent electrode to detect a position of a object that touches an outer surface of the touch panel.

According to still another aspect of the present invention for achieving the fifth feature of the present invention, there is provided a liquid crystal display apparatus comprising: a liquid crystal display panel for displaying an image; and a touch panel including i) a first transparent electrode disposed on an upper surface of the liquid crystal display panel, ii) a second transparent electrode separated from the first transparent electrode by a predetermined distance, iii) an optical film disposed on the second transparent electrode, iv) a first polarizing member disposed on the optical film, and v) a spacer disposed between the first and second transparent electrodes, and the touch panel detecting a point at which the first transparent electrode is electrically connected to the second transparent electrode to detect a position of an object that touches an outer surface of the touch panel.

According to sill another aspect of the present invention for achieving another feature of the present invention, there is provided a liquid crystal display apparatus comprising a liquid crystal display panel and a touch panel. The liquid crystal display panel includes a color filter substrate, a thin film transistor substrate and a liquid crystal interposed between the color filter substrate and the thin film transistor substrate. The touch panel is disposed on the color filter substrate, and includes a first retardation film having a first transparent electrode and a second retardation film having a second transparent electrode spaced apart from the first transparent electrode and making contact with the first transparent electrode by an externally provided pressure to generate a position information of the pressure. At least one of the first and second retardation films includes a plurality of scattering parts.

The first retardation film may include a plurality of first scattering parts, and the second retardation film may include a plurality of second scattering parts. A size of each of the first and second scattering parts may be from about 0.01 μm to about 200 μm. A summation of volume of the first and second scattering parts may be about 10% to about 80% of a total volume of the first and second retardation films.

The scattering parts may include scattering protrusions, scattering particles, scattering beads, scattering columns, scattering prisms, etc.

According to above liquid crystal display apparatus, the liquid crystal display panel and the polarizing member respectively substitute for a first substrate for supporting the first transparent electrode and a second substrate for supporting the second transparent electrode. Accordingly, an unnecessary substrate that causes the increase of the thickness of the liquid crystal display apparatus may be removed, the entire thickness of the liquid crystal display apparatus may be decreased, and the manufacturing cost of the liquid crystal display apparatus may be reduced.

According to the present invention, the liquid crystal display apparatus includes first and second transparent electrodes. The first and second transparent electrodes are comprised of a transparent conductive material and are spaced apart from each other by a predetermined distance.

The first transparent electrode is supported by the second transparent substrate of the color filter substrate. The second transparent electrode is supported by the polarizer.

Accordingly, another substrate that supports the first and second transparent electrodes may be removed, the entire thickness of the liquid crystal display apparatus may be decreased, and the manufacturing cost of the liquid crystal display apparatus may be reduced.

In addition, the number of the transparent substrates, through which the light incident into the liquid crystal display panel or the light exiting from the liquid crystal display panel is transmitted, is reduced, thereby reducing loss of light and enhancing optical characteristics of the liquid crystal display apparatus.

Furthermore, the first and second transparent electrodes are formed on the first and second retardation films so that the entire thickness of the liquid crystal display apparatus may be decreased, and the manufacturing cost of the liquid crystal display apparatus may be reduced. Also, the scattering parts are formed in the first and second retardation films to improve an image display quality of the liquid crystal display apparatus.

BRIEF DESCRIPTION OF THE DRAWINGS

The above and other advantages of the present invention will become more apparent by describing in detail exemplary embodiments thereof with reference to the accompanying drawings, in which.

BEST MODE FOR CARRYING OUT THE INVENTION

Hereinafter the preferred embodiment of the present invention will be described in detail with reference to the accompanying drawings.

Figure 1:
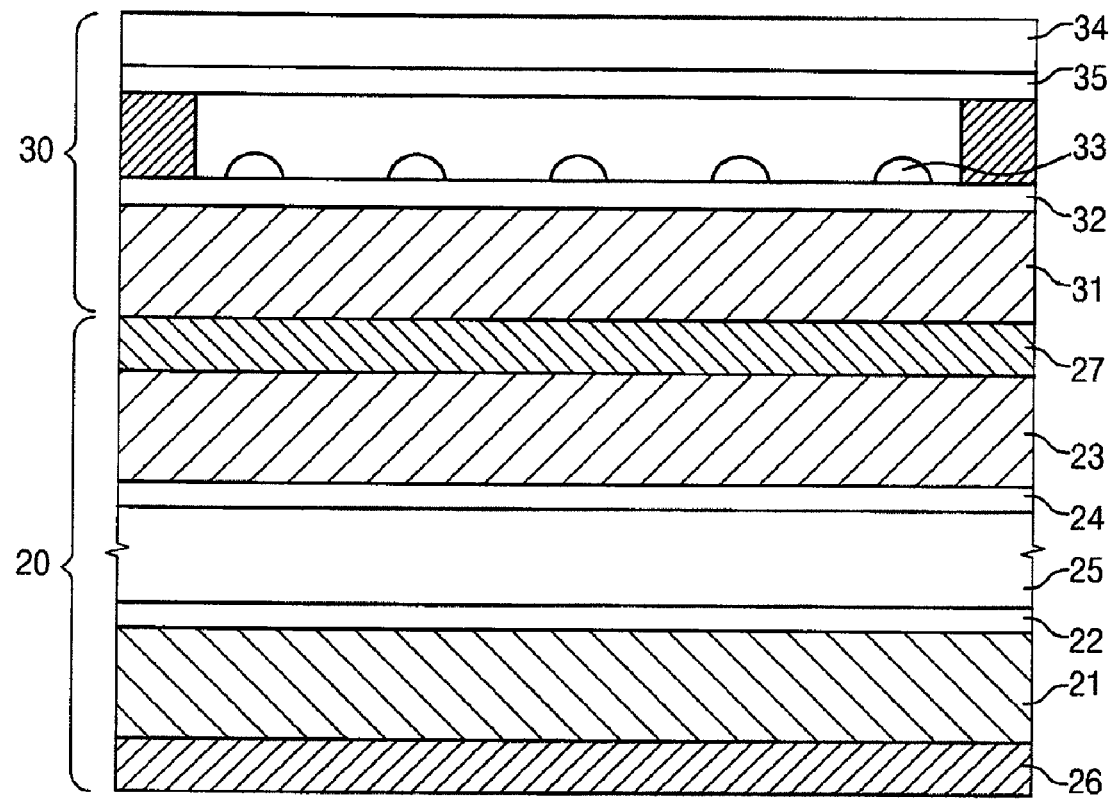
FIG. 1 is a cross sectional view showing a conventional liquid crystal display apparatus.
Figure 2:
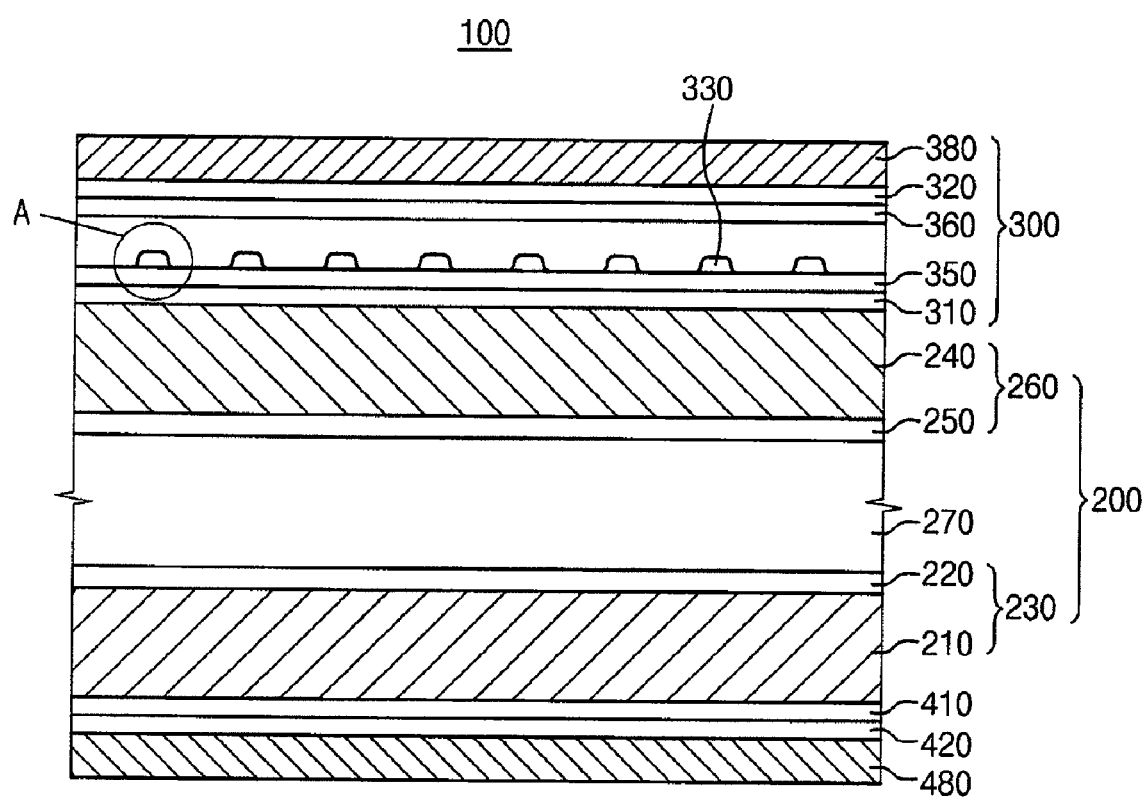
FIG. 2 is a cross sectional view showing a liquid crystal display apparatus according to a first exemplary embodiment of the present invention.

FIG. 2 is a cross sectional view showing a liquid crystal display apparatus according to a first exemplary embodiment of the present invention.

Referring to FIG. 2, the liquid crystal display apparatus 100 according to the first embodiment of the present invention includes a liquid crystal display panel 200, a touch panel 300 and a plurality of optical plates 410, 420 and 480 disposed on a lower surface of the liquid crystal display panel 200. The liquid crystal display panel 200 displays an image. The touch panel 300 detects a position of an object that touches an outer surface of the touch panel.

The liquid crystal display panel 200 includes a TFT substrate 230, a color filter substrate 260 facing the TFT substrate 230, and a liquid crystal layer 270 interposed between the TFT substrate 230 and the color filter substrate 260.

The TFT substrate 230 includes a plurality of switching devices (not shown) and a plurality of pixel electrodes each electrically connected with each of the switching devices. The switching devices are formed on the first transparent substrate 210. The color filter substrate 260 includes color filters (not shown) and a common electrode 250 formed on the color filters. The color filters are formed on the second transparent substrate 240.

The touch panel 300 includes a first retardation film (or phase difference film) 310, a second retardation film 320 and a first polarizer 380 disposed on an upper surface of the second retardation film 320. The first retardation film 310 is disposed on an upper surface of the color filter substrate 260, and a first transparent electrode 350 is formed on the first retardation film 310. A second transparent electrode 360 that is spaced apart from the first transparent electrode 350 by a predetermined distance is formed on the second retardation film 320. The first retardation film 310 is a λ/4 retardation film, and the second retardation film 320 is a λ/2 retardation film.

The first and second transparent electrodes 350 and 360 are comprised of a transparent conductive material such as indium tin oxide (ITO) or indium zinc oxide (IZO).

An adhesive (not shown) comprised of insulating material is interposed between the first and second transparent electrodes 350 and 360. The adhesive combines the first and second transparent electrodes 350 and 360 with each other. The first transparent electrode 350 is separated from the second transparent electrode 360 by the thickness of the adhesive interposed between the first and second transparent electrodes 350 and 360.

A plurality of spacers 330 is formed on the first transparent electrode 350. The spacers 330 may be formed on the second transparent electrode 360.

A third retardation film 410, a fourth retardation film 420 and a second polarizer 480 may be disposed on a lower surface of the liquid crystal display panel 200.

The third retardation film 410 is disposed on the lower surface of the liquid crystal display panel 200, the fourth retardation film 420 is disposed on a lower surface of the third retardation film 410, and the second polarizer 480 is disposed on a lower surface of the fourth retardation film 420. The third retardation film 410 is a λ/4 retardation film, and the fourth retardation film 420 is a λ/2 retardation film.

The first, second, third and fourth retardation films 310, 320, 410 and 420 are comprised of polyarylate or polyether sulfone. The polyarylate is thermoplastic resin of aromatic polyester.

The first retardation film 310 on which the first transparent electrode 350 is formed is supported by the second transparent substrate 240 or the color filter substrate. The second retardation film 320 on which the second transparent electrode 360 is formed is supported by the first polarizer 380. Accordingly, an unnecessary substrate that causes the increase in the thickness of the liquid crystal display apparatus may be removed, the entire thickness of the liquid crystal display apparatus may be decreased, and the manufacturing cost of the liquid crystal display apparatus may be reduced.

Although the above embodiments show a reflective and transmissive type liquid crystal display panel, a reflective liquid crystal display panel could be utilized to display an image, as would be known to one of the ordinary skill in the art. The liquid crystal display apparatus 100 may not have the third retardation film 410, the fourth retardation film 420 and the second polarizer 480.

Figure 3:
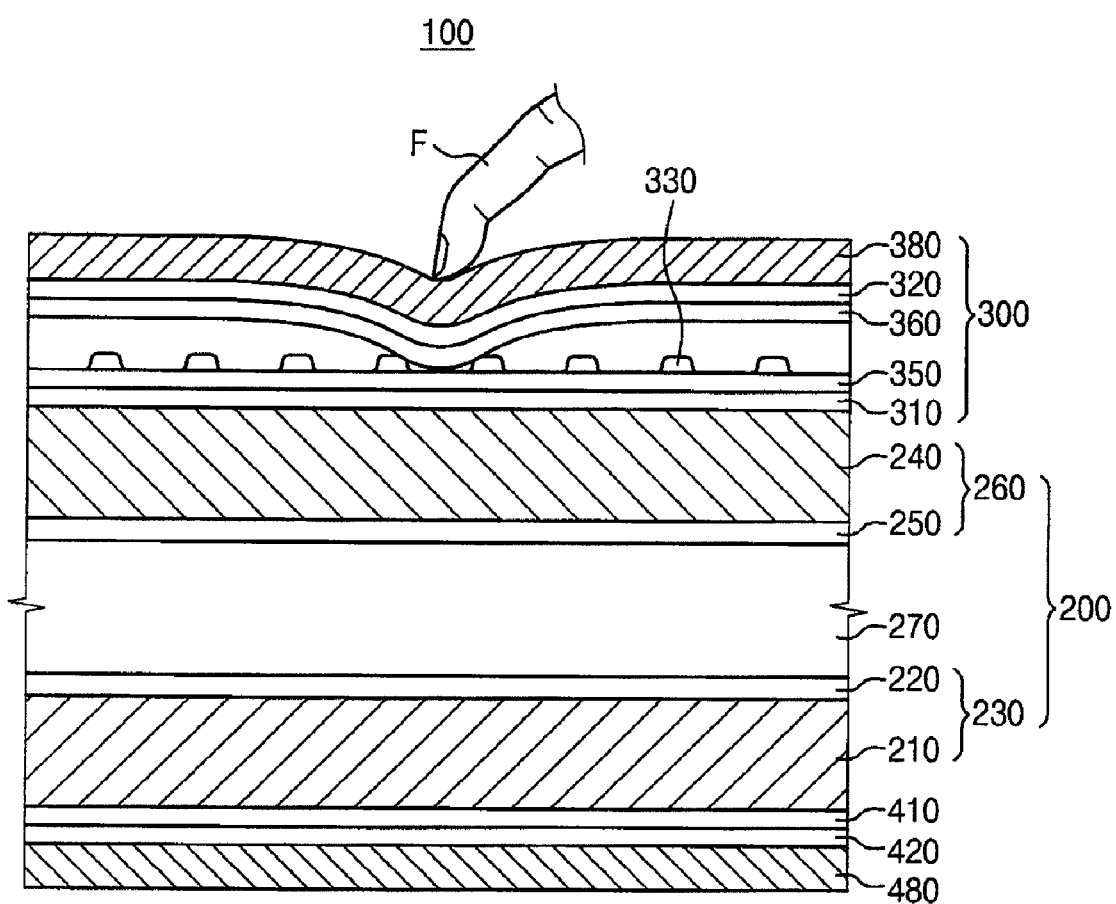
FIG. 3 is a schematic view showing the liquid crystal display apparatus of FIG. 2 when a touch screen is pressed down.
Figure 4:
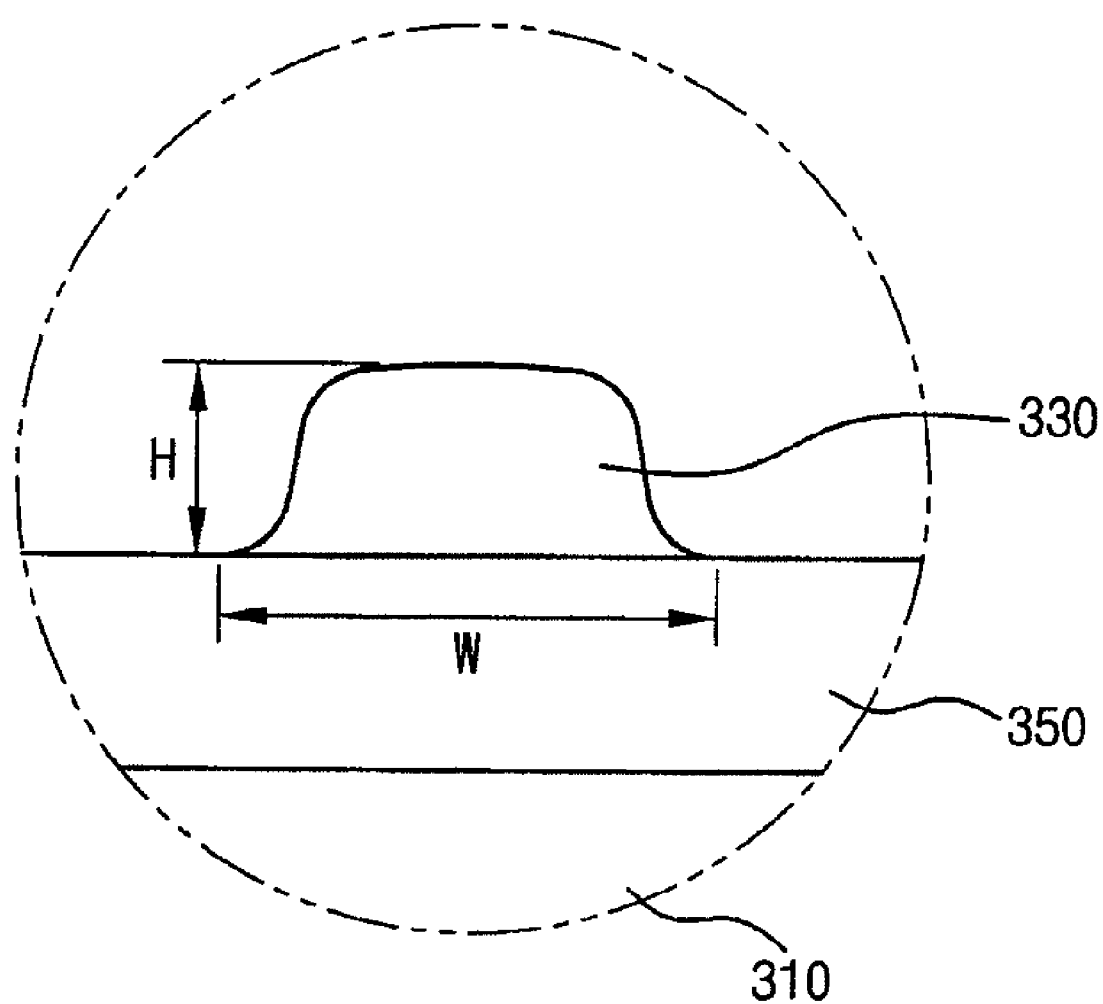
FIG. 4 is an enlarged view of a portion 'A' in FIG. 2.

FIG. 3 is a schematic view showing the liquid crystal display apparatus of FIG. 2 when a touch screen is pressed down, and FIG. 4 is an enlarged view of a portion 'A' of FIG. 2.

Referring to FIGS. 3 and 4, the first and second transparent electrodes 350 and 360 of the liquid crystal display apparatus 100 make electrical contact with each other by an object such as a finger of a user.

The first polarizer 380 is pressed down by the user's finger when the user inputs information through the touch panel.

The first and second transparent electrodes 350 and 360 are comprised of a transparent conductive material having resistive property. The first and second transparent electrodes 350 and 360 have linear voltage distribution when current is applied to the first and second transparent electrodes 350 and 360.

Accordingly, when the first and second transparent electrodes 350 and 360 make contact with each other by the finger of the user, the voltage of the contact point between the first and second transparent electrodes 350 and 360 is measured, so that the position of an object that touches an outer surface of the touch panel can be detected.

A plurality of spacers 330 is formed on the first transparent electrode 350. A height of each of the spacers 330 is smaller than the distance between the first and second transparent electrodes 350 and 360.

The spacers 330 have a dot shape. Although the above embodiments discuss a spacer having a dot shape, a spacer having circular cylinder, elliptic cylinder shape or any other shapes known to one of the ordinary skill in the art may also be utilized in place of or in conjunction with the spacer having a dot shape.

A width of the lower face of the spacer 330 may be wider a width of the upper face of the spacer 330. For example, the width of the lower face of the spacer 330 may be between about 10 μm and about 80 μm, and the height of the spacer 330 may be between about 2 μm and about 20 μm.

The spacers 330 absorb the impact on the first and second transparent electrodes 350 and 360 when the second transparent electrode 360 is pressed and makes contact with the first transparent electrode 350. In addition, the spacer 330 provide the second transparent electrode 360 with restoring forces so that the second transparent electrode 360 is separated from the first transparent electrode 350 when the user takes off (or withdraws) his finger from the touch panel 300.

Figure 5:
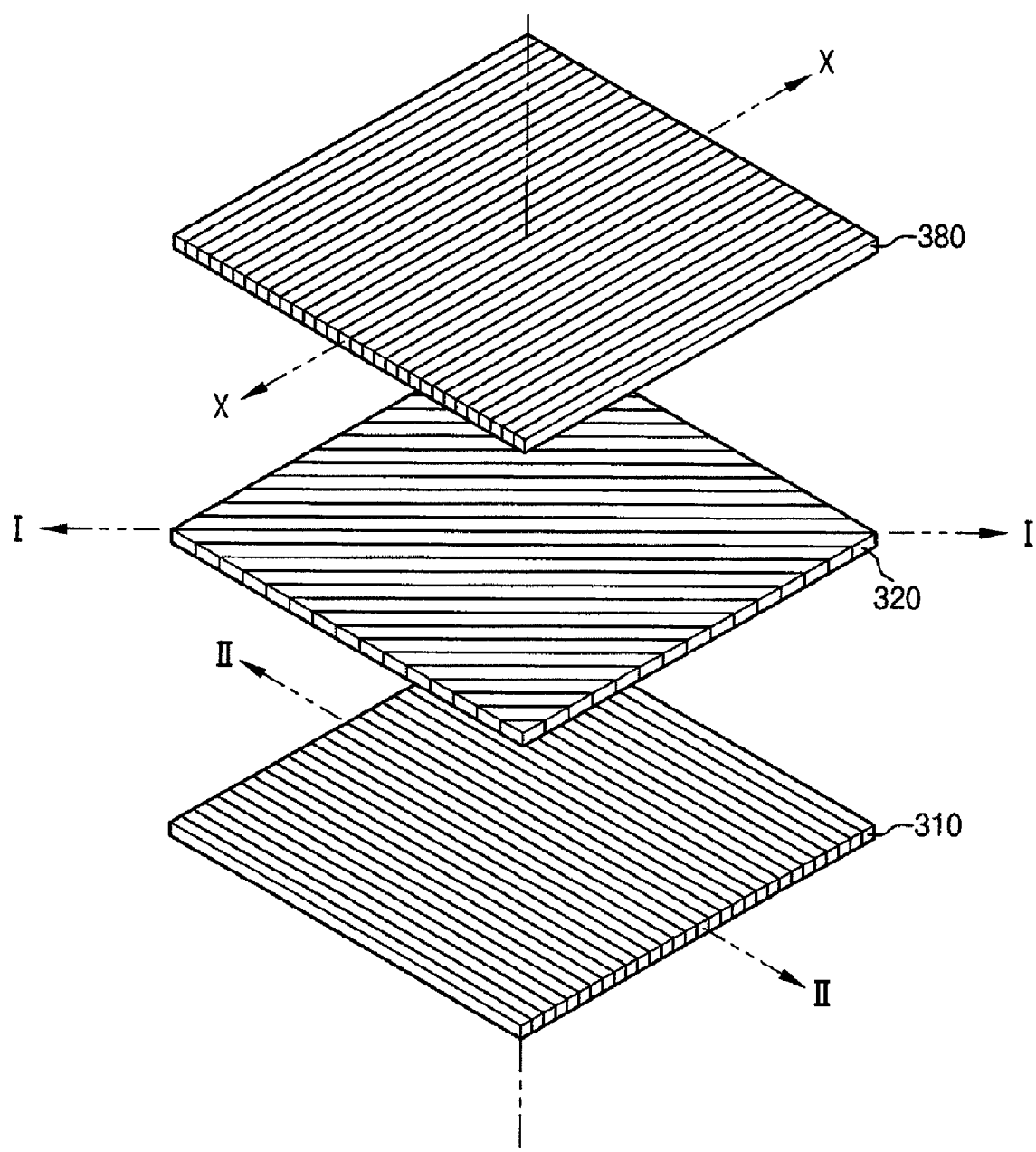
FIG. 5 is a schematic view showing an arrangement among a first polarizing film, a first retardation film and a second retardation film.

FIG. 5 is a schematic view showing an arrangement among a first polarizing film, a first retardation film and a second retardation film.

Referring to FIG. 5, the first retardation film 310, the second retardation film 320 and the first polarizer 380 are arranged so as to enhance the optical characteristic of the light from the liquid crystal display panel 200.

An X-axis is referred to as a polarizing axis of the first polarizer 380, an I-axis is referred to as a retardation axis of the second retardation film 320, and an II-axis is referred to as a retardation axis of the first retardation film 310.

The second retardation film 320 is disposed under the first polarizer 380 so that the I-axis forms an angle between about 45° and about 135° with respect to the II-axis. In addition, the first retardation film 310 is disposed under the second retardation film 320 so that the II-axis forms an angle between about 90° and about 180° with respect to the X-axis.

The third retardation film 410, the fourth retardation film 420 and the second polarizer 480 of FIG. 2 are arranged in the same manner as the first retardation film 310, the second retardation film 320 and the first polarizer 380.

Figure 6:
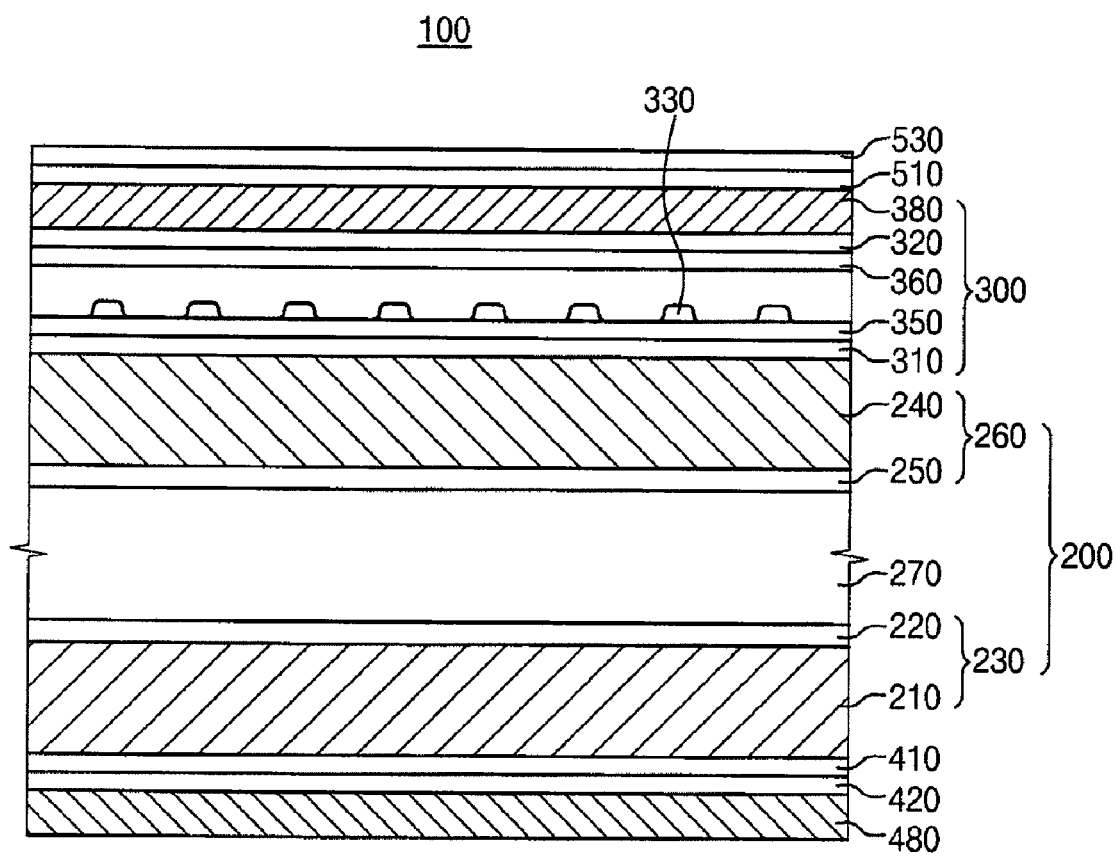
FIG. 6 is a cross sectional view showing a liquid crystal display apparatus that further includes a hard coated film and a reflection protection film in addition to the liquid crystal display apparatus of FIG. 2.

FIG. 6 is a cross sectional view showing a liquid crystal display apparatus that further includes a hard coated film and a reflection protection film in addition to the liquid crystal display apparatus of FIG. 2.

Referring to FIG. 6, the hard coated film 510 and the reflection protection film 530 is disposed sequentially on the first polarizer 380.

A portion of the surface of the first polarizer 380 in the touch panel 300 may be pressed down by the object or the finger of the user many times until the liquid crystal display apparatus may reach the expected life span thereof.

Accordingly, the surface of the first polarizer 380 may be easily damaged by the repeated pressing actions. The hard coated film 510 is formed on the first polarizer 380 so that the first polarizer 380 should not be damaged. The hard coated film 510 may be comprised of polyacryl resin.

The reflection protection film 530 is formed on the hard coated film 510, and prevents light from being reflected from the surface of the hard coated film 510.

Although only the hard coated film 510 is formed on the first polarizer 380, the hard coated film may prevent the light incident thereonto from being reflected therefrom because the hard coated film 510 absorbs external light incident thereonto.

In addition, only the reflection protection film 530 without the hard coated film 510 may protect the surface of the first polarizer 380 when the reflection protection film 530 has Mohs hardness of about 3 or more.

Figure 7:
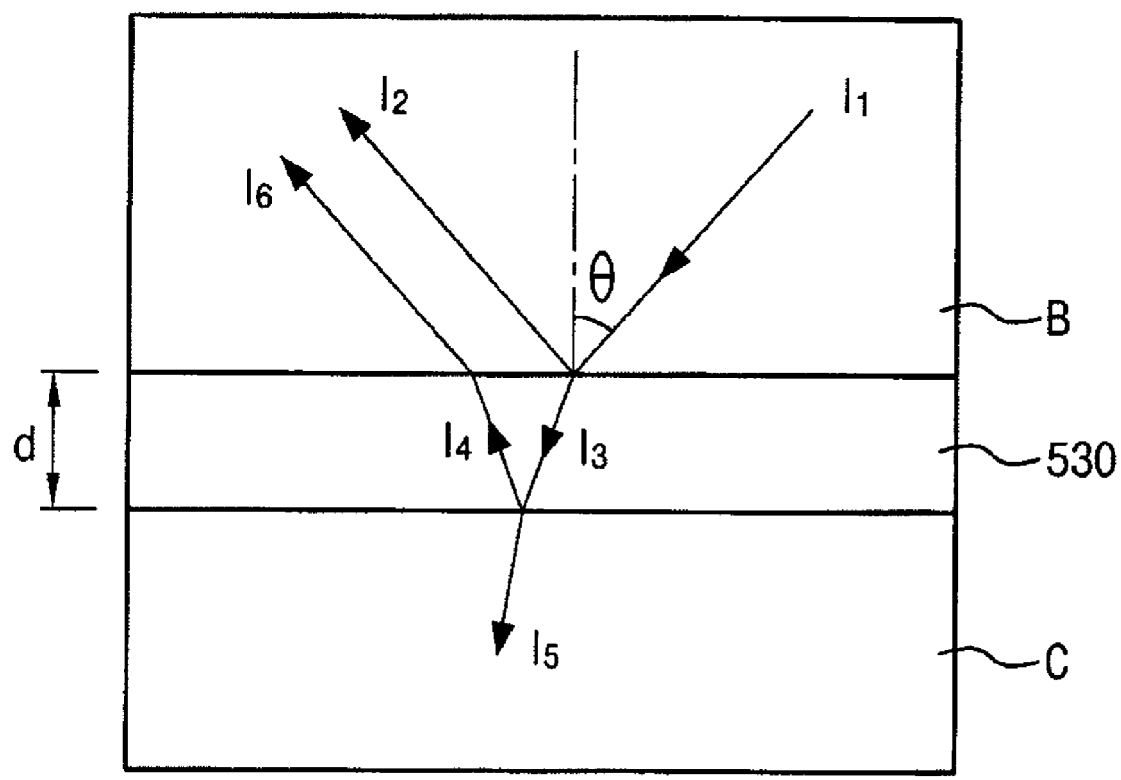
FIG. 7 is a schematic view showing the reflection protection film.

FIG. 7 is a schematic view showing the reflection protection film;

Referring to FIG. 7, a first light I1 is incident onto the reflection protection film 530 from a first medium B in an incident angle θ. A portion of the first light I1 is reflected from the reflection protection film 530 in the angle θ to be a second light I2. A remaining portion of the first light I1 is refracted toward the reflection protection film 530 as a third light I3.

The third light I3 advances into the reflection protection film 530, a portion of the third light I3 is reflected form an interface between the reflection protection film 530 and a second medium C to be a fourth light I4. A remaining portion of the third light I3 is refracted toward the second medium C to be a fifth light I5.

The fourth light I4 exits toward the first medium and is refracted as a sixth light I6.

The phase of the reflected light is not varied when the light advancing from a medium having high refractivity toward a medium having a low refractivity is reflected from the interface between the two mediums. The phase of the reflected light is varied by 180° when the light advancing from a medium having low refractivity toward a medium having a high refractivity is reflected from the interface between the two mediums. However, the phase of the transmitted light is not varied.

The thickness d of the reflection protection film 530 is determined in view of the refractivity $n_a$ of the reflection protection film 530, the refractivities $n_b$ and $n_c$ of the first and second medium B and C so that the second light I2 and the sixth light I6 are interfered with each other to disappear by a destructive interference on the surface of the reflection protection film 530.

Accordingly, reflection phenomenon on the surface of the reflection protection film 530 may be prevented.

Figure 8A:
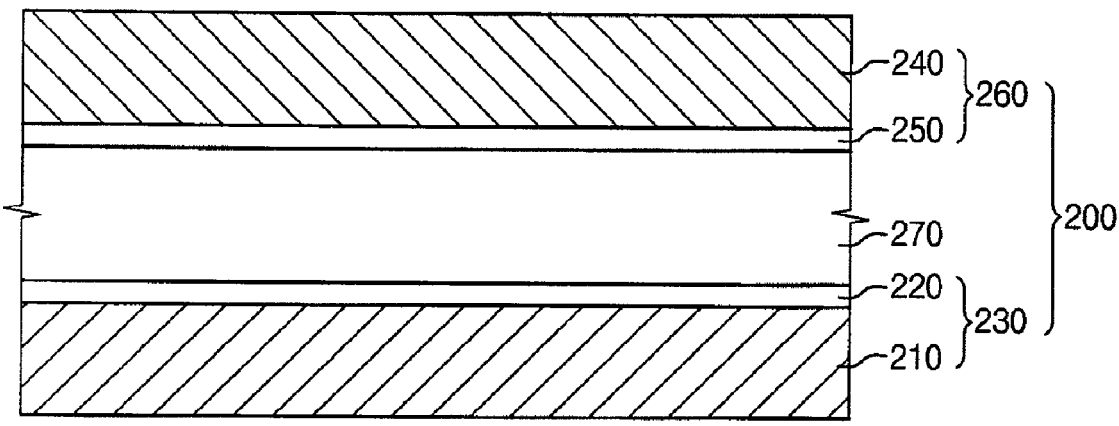
FIGS. 8A, 8B and 8C are cross sectional views showing a method of manufacturing the liquid crystal display apparatus according to the first exemplary embodiment of the present invention.
Figure 8B:
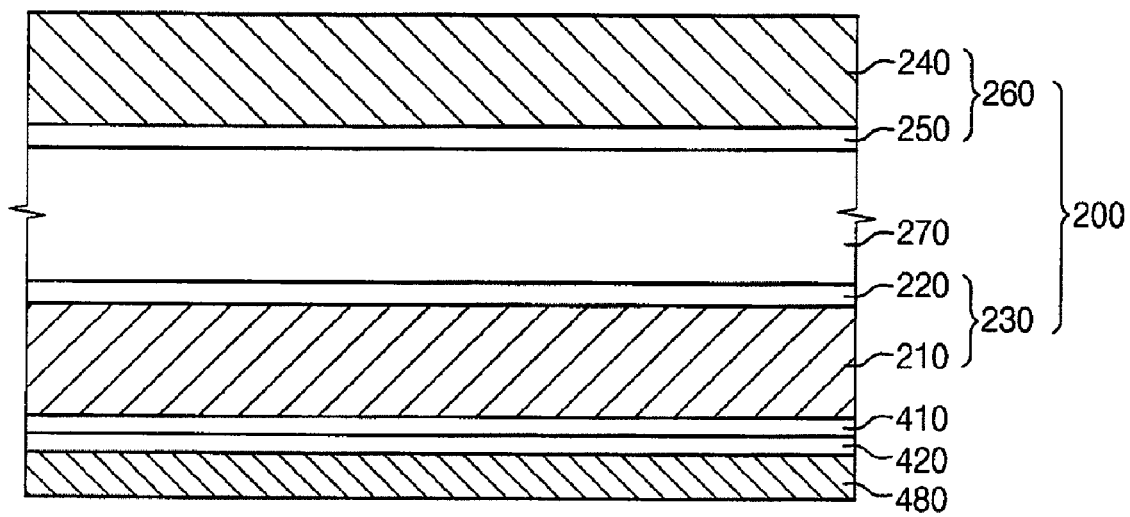
Figure 8C:
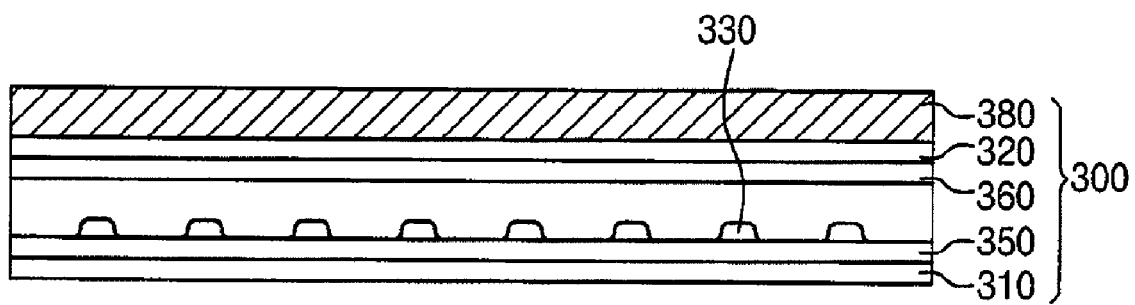

FIGS. 8A, 8B and 8C are cross sectional views showing a method of manufacturing the liquid crystal display apparatus according to the first exemplary embodiment of the present invention.

Referring to FIG. 8A, first, a liquid crystal display panel 200 is formed. The liquid crystal display panel 200 ha a TFT substrate 230, a color filter substrate 260 facing the TFT substrate 230 and a liquid crystal layer 270 interposed between the TFT substrate 230 and the color filter substrate 260.

The TFT substrate 230 includes a plurality of switching devices (not shown) and a plurality of pixel electrodes, each of the pixel electrodes being electrically connected with each of the switching devices. The switching devices are formed on a first transparent substrate 210. The color filter substrate 260 includes color filters (not shown) and a common electrode 250 formed on the color filters. The color filters are formed on a second transparent substrate 240.

Referring to FIG. 8B, a third retardation film 410, a fourth retardation film 420 and a second polarizer 480 are formed on a lower surface of the liquid crystal display panel 200.

In detail, the third and fourth retardation films 410 and 420 are formed successively on the second polarizer 480. Then, the second polarizer 480 having the third and fourth retardation films 410 and 420 is attached to the lower surface of the liquid crystal display panel 200. The first transparent substrate 210 makes contact with the third retardation film 410.

Referring to FIG. 8C, a second retardation film 320 is formed on the first polarizer 380. Then, a transparent conductive material such as ITO or IZO is deposited on the second retardation film 320, thereby forming a second transparent electrode 360.

A first transparent electrode 350 is formed on the first retardation film 310. A transparent conductive material such as ITO or IZO is deposited on the first retardation film 310, thereby forming a first transparent electrode 350.

Then, a plurality of spacers 330 is formed on the first transparent electrode 350, an adhesive (not shown) comprised of insulating material is formed at the boundary portion of the first transparent electrode 350.

The first transparent electrode 350 faces the second transparent electrode 360. The second transparent electrode 360 is attached to the first transparent electrode 350 by means of the adhesive formed on the boundary portion of the first transparent electrode 350. The first and second transparent electrodes 350 and 360 are separated from each other by the thickness of the adhesive.

Then, the first retardation film 310 is combined with the second transparent electrode 240 of the color filter substrate 260 of FIG. 2, thereby completing the liquid crystal display apparatus 100 of FIG. 2.

The step illustrated in FIG. 8C may be performed prior to the step illustrated in FIG. 8B.

FIGS. 9A, 9B, 9C and 9D are cross sectional views showing a method of forming the spacer of FIG. 4.

Figure 9A:
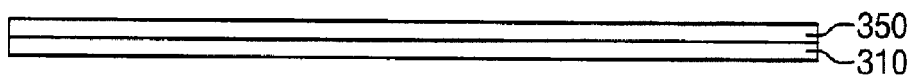
FIGS. 9A, 9B, 9C and 9D are cross sectional views showing a method of forming the spacer of FIG. 4.

Referring to FIG. 9A, the first transparent electrode 350 comprised of a transparent conductive material such as ITO or IZO is formed on the first retardation film 310.

Figure 9B:
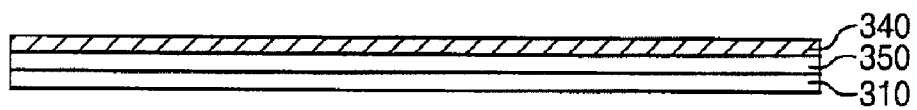

Then, as shown in FIG. 9B, a photosensitive organic layer 340 is deposited in a uniform thickness on the first retardation film 310.

Figure 9C:
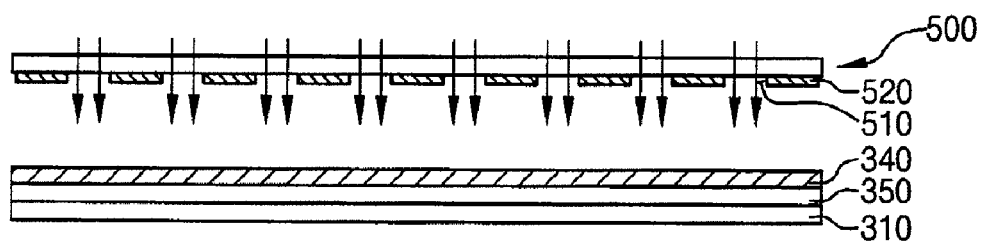
Figure 9D:
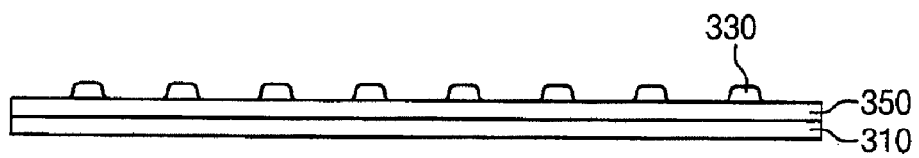

Referring to FIG. 9C, a mask 500 is aligned over the photosensitive organic layer 340. The mask 500 has a transmitting layer for transmitting light therethrough and the blocking layer for blocking the light. Then, an exposure process is performed by means of the mask 500. In detail, ultra violet is applied onto the photosensitive organic layer 340 through the mask 500.

The photosensitive organic layer 340 deposited on the first transparent electrode 350 may be a negative photoresist, and the exposed area of the photosensitive organic layer 340 onto which UV light is supplied is polymerized. Accordingly, an unexposed area that is not polymerized is etched away by a developer solution, thereby forming the spacers 330 of FIG. 9D. A baking process may be further performed so as to cure the spacers 330.

Figure 10:
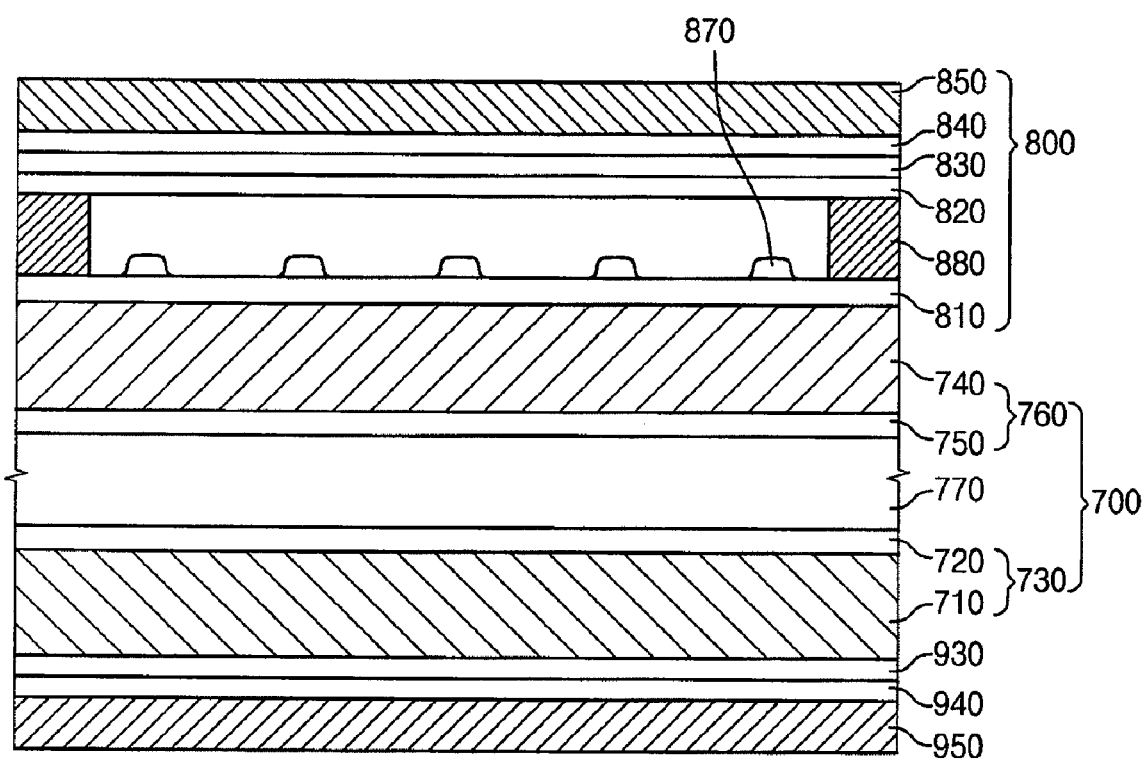
FIG. 10 is a cross sectional view showing a liquid crystal display apparatus according to a second exemplary embodiment of the present invention.

FIG. 10 is a cross sectional view showing a liquid crystal display apparatus according to a second exemplary embodiment of the present invention.

Referring to FIG. 10, the liquid crystal display apparatus 600 according to the second exemplary embodiment of the present invention includes a liquid crystal display panel 700, a touch panel 800 and a plurality of optical plates 930, 940 and 950. The liquid crystal display panel 700 displays an image, and the touch panel 800 detects the position of the object that touches an outer surface of the touch panel 800. The optical plates 930, 940 and 950 are disposed on the lower surface of the liquid crystal display panel 700.

The liquid crystal display panel 700 includes a TFT substrate 730, a color filter substrate 760 facing the TFT substrate 730, and a liquid crystal layer 770 interposed between the TFT substrate 730 and the color filter substrate 760.

The TFT substrate 730 includes a plurality of switching devices (not shown) and a plurality of pixel electrodes each of which is electrically connected with each of the switching devices. The switching devices are formed on the first transparent substrate 710. The color filter substrate 760 includes color filters (not shown) and a common electrode 750 formed on the color filters. The color filters are formed on the second transparent substrate 740.

The touch panel 800 includes a first retardation film 810, a second retardation film 820, first and second retardation films 830 and 840 disposed on an upper surface of the second transparent electrode 820, and a first polarizer 850 disposed on the second retardation film 840. The first transparent electrode 810 is disposed on an upper surface of the color filter substrate 760, and the second transparent electrode 760 is separated from the first transparent electrode 850 by a predetermined distance.

The first retardation film 810 is a λ/4 retardation film, and the second retardation film 840 is a λ/2 retardation film. The first and second transparent electrodes 810 and 820 are comprised of a transparent conductive material such as indium tin oxide (ITO) or indium zinc oxide (IZO).

An adhesive (not shown) comprised of an insulating material is interposed between the first and second transparent electrodes 810 and 820. The adhesive combines the first and second transparent electrodes 810 and 820 with each other. The first transparent electrode 810 is separated from the second transparent electrode 820 by the thickness of the adhesive interposed between the first and second transparent electrodes 810 and 820.

A plurality of spacers 870 is formed on the first transparent electrode 810. The spacers 870 may be formed on the second transparent electrode 820.

A detailed description about the spacer 870 will be omitted because the spacer 870 is the same as the spacer 330 of FIG. 4.

A third retardation film 930, a fourth retardation film 940 and a second polarizer 950 may be disposed on a lower surface of the liquid crystal display panel 700.

The third retardation film 930 is disposed on the lower surface of the liquid crystal display panel 700, the fourth retardation film 940 is disposed on a lower surface of the third retardation film 930, and the second polarizer 950 is disposed on a lower surface of the fourth retardation film 940. The third retardation film 930 is a λ/4 retardation film, and the fourth retardation film 940 is a λ/2 retardation film.

The first, second third and fourth retardation films 830, 840, 930 and 940 are comprised of polyarylate or polyether sulfone resin.

The first retardation film 830, the second retardation film 840 and the first polarizer 850 are arranged so as to enhance the optical characteristic of the light from the liquid crystal display panel 700.

The second retardation film 840 is disposed under the first polarizer 850 so that the a polarizing axis of the first polarizer 850 forms an angle between about 45° and about 135° with respect to a retardation axis of the second retardation film 840. In addition, the first retardation film 830 is disposed under the second retardation film 840 so that a polarizing axis of the first polarizer 850 forms an angle between about 90° and about 180° with respect to a retardation axis of the first retardation film 830.

A third retardation film 930, a fourth retardation film 940 and a second polarizer 950 are arranged in the same manner as the first retardation film 830, the second retardation film 840 and the first polarizer 850.

In addition, the hard coated film and the reflection protection film illustrated in FIG. 6 may be further formed on the first polarize 530.

The first retardation film 310 on which the first transparent electrode 350 is formed is supported by the second transparent substrate 240 or the color filter substrate.

The first transparent electrode 810 is supported by the second transparent substrate 740 of the color filter substrate 760. The second transparent electrode 820 is supported by the first polarizer 850. Accordingly, an unnecessary substrate that causes the increase of the thickness of the liquid crystal display apparatus may be removed, the entire thickness of the liquid crystal display apparatus maybe decreased, and the manufacturing cost of the liquid crystal display apparatus may be reduced.

Although the above embodiments discuss a reflective and transmissive type liquid crystal display panel, a reflective liquid crystal display panel could be utilized to display an image, as would be known to one of the ordinary skill in the art. The liquid crystal display apparatus 600 may not have the third retardation film 930, the fourth retardation film 940 and the second polarizer 950.

Figure 11:
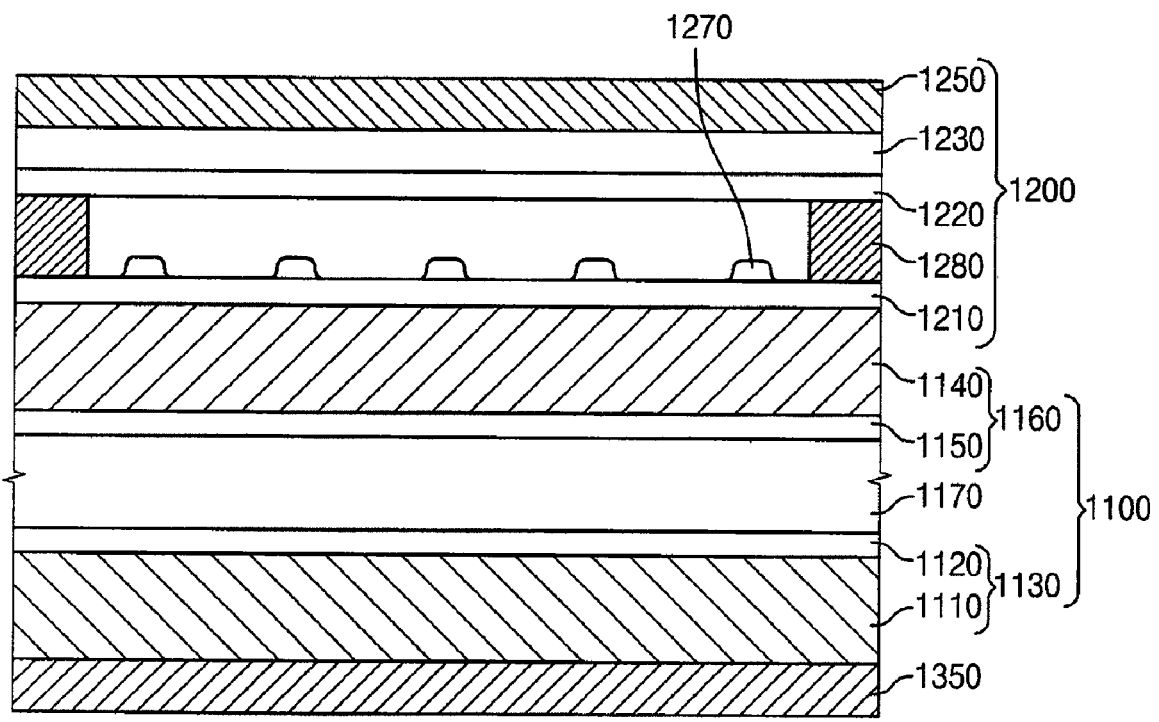
FIG. 11 is a cross sectional view showing a liquid crystal display apparatus according to a third exemplary embodiment of the present invention.

FIG. 11 is a cross sectional view showing a liquid crystal display apparatus according to a third exemplary embodiment of the present invention.

Referring to FIG. 11, the liquid crystal display apparatus 1000 according to the third exemplary embodiment of the present invention includes a liquid crystal display panel 1100, a touch panel 1200 and a second polarizer 1350. The liquid crystal display panel 1100 displays an image, and the touch panel 1200 detects the position of the object that touches an outer surface of the touch panel 1200. The second polarizer 1350 is disposed on a lower surface of the liquid crystal display panel 1100.

The liquid crystal display panel 1100 includes a TFT substrate 1130, a color filter substrate 1160 facing the TFT substrate 1130, and a liquid crystal layer 1170 interposed between the TFT substrate 1130 and the color filter substrate 1160.

The TFT substrate 1130 includes a plurality of switching devices (not shown) and a plurality of pixel electrodes 1120 each of which is electrically connected with each of the switching devices. The switching devices are formed on the first transparent substrate 1110. The color filter substrate 1160 includes color filters (not shown) and a common electrode 1150 formed on the color filters. The color filters are formed on the second transparent substrate 1140.

The touch panel 1200 includes a first transparent electrode 1210, a second transparent electrode 1220, an optical film 1230 and a first retardation film 1250. The first transparent electrode 1210 is disposed on an upper surface of the color filter substrate 1160, and the second transparent electrode 1220 is separated from the first transparent electrode 1210 by a predetermined distance. The optical film 1230 is disposed on an upper surface of the second transparent electrode 1220, and the first polarizer 1250 is disposed on an upper surface of the optical film 1230.

The optical film 1230 is comprised of a material having an isotropic refractivity such as polycarbonate.

An adhesive 1280 comprised of an insulating material is interposed between the first and second transparent electrodes 1210 and 1220. The adhesive 1280 combines the first and second transparent electrodes 1210 and 1220 with each other. The first transparent electrode 1210 is separated from the second transparent electrode 1220 by the thickness of the adhesive interposed between the first and second transparent electrodes 1210 and 1220.

A plurality of spacers 1270 is formed on the first transparent electrode 1210. The spacers 1270 may be formed on the second transparent electrode 1220.

A detailed description about the spacer 1270 will be omitted because the spacer 1270 is the same as the spacer 330 of FIG. 4.

A second polarizer 1350 may be disposed on a lower surface of the liquid crystal display panel 1100.

In addition, the hard coated film and the reflection protection film illustrated in FIG. 6 may be further formed on the first polarizer 1250.

The first transparent electrode 1210 is supported by the second transparent substrate 1140 of the color filter substrate 1160. The second transparent electrode 1220 is supported by the first polarizer 1250. Accordingly, an unnecessary substrate that causes the increase of the thickness of the liquid crystal display apparatus may be removed, the entire thickness of the liquid crystal display apparatus may be decreased, and the manufacturing cost of the liquid crystal display apparatus may be reduced.

Although the above embodiment discuss a reflective and transmissive type liquid crystal display panel, a reflective liquid crystal display panel could be utilized to display an image, as would be known to one of the ordinary skill in the art. The liquid crystal display apparatus 1000 may not have the second polarizer 1350.

Figure 12:
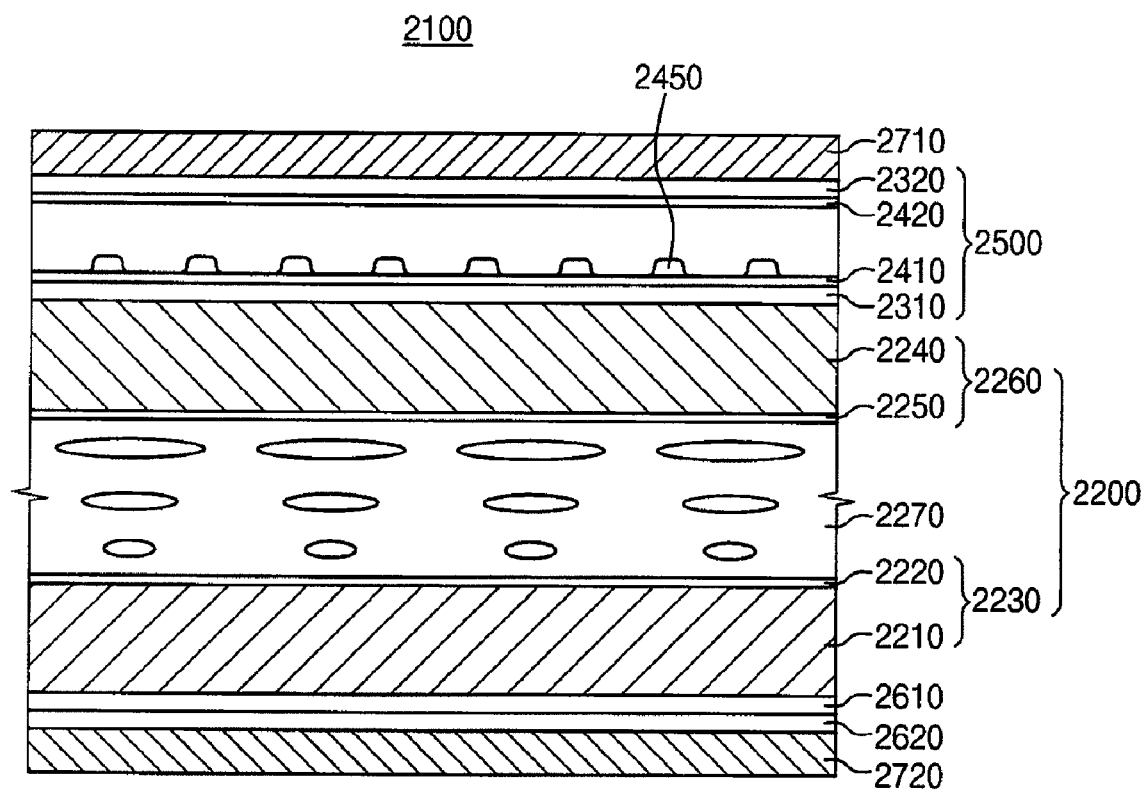
FIG. 12 is a cross sectional view showing a liquid crystal display apparatus according to another exemplary embodiment of the present invention.

FIG. 12 is a cross sectional view showing a liquid crystal display apparatus according to another exemplary embodiment of the present invention.

Referring to FIG. 12, the liquid crystal display apparatus 2100 includes a liquid crystal display panel 2200, a touch panel 2500, a third retardation film 2610, a fourth retardation film 2620, a first polarizer 2710 and a second polarizer 2720. The touch panel 2500 includes a first retardation film 2310 and a second retardation film 2320.

For example, the touch panel 2500 is disposed on the liquid crystal display panel 2200. The first polarizer 2710 is disposed on the touch panel 2500. The third and fourth retardation films 2610 and 2620 are disposed under the liquid crystal display panel 2200, in sequence. The second polarizer 2720 is under the fourth retardation film 2620.

The liquid crystal display panel 2200 displays an image using light. The liquid crystal display panel 200 includes a thin film transistor (TFT) substrate 2230, a color filter substrate 2260 and a liquid crystal layer 2270. The liquid crystal layer 2270 is interposed between the TFT substrate 2230 and the color filter substrate 2260.

The TFT substrate 2230 includes a first transparent substrate 2210 and a plurality of thin film transistors (not shown) that are formed on the first transparent substrate 2210. A pixel electrode 2220 is formed on the TFT substrate 2230 to receive a driving voltage, thereby driving the liquid crystal layer 2270.

The color filter substrate 2260 faces the TFT substrate 2230. The color filter substrate 2260 includes a second transparent substrate 2240 and a plurality of color filters (not shown) that are formed on the second transparent substrate 2240. A common electrode 2250 facing the pixel electrode 2220 is formed on the color filter substrate 2260.

The touch panel 2500 includes a first retardation film 2310, a second retardation film 2320, a first transparent electrode 2410 and a second transparent electrode 2420. The first transparent electrode 2410 of the touch panel 2500 may be electrically connected to the second transparent electrode 2420 to detect an input information of a user.

In FIG. 12, one of the first and second retardation films 2310 and 2320 may include a plurality of scattering particles (not shown) to diffuse the light incident into the first retardation film 2310 or the second retardation film 2320. The scattering particles will be explained.

Linearly polarized light having passed through the first polarizer 2710 that is on the first retardation film 2310 includes a X component and a Y component that is substantially in perpendicular to the X component. The X component is substantially in perpendicular to a propagation direction of the linearly polarized light.

For example, the first retardation film 2310 is on the second transparent substrate 2240 of the color filter substrate 2260. The first retardation film 2310 changes a phase of the light incident into the first retardation film 2310 so that a phase difference between the X component and the Y component of the light is about $\lambda/4$. Thus, the linearly polarized light is changed into a circularly polarized light. In addition, when the circularly polarized light is incident into the first retardation film 2310, the circularly polarized light is changed into the linearly polarized light.

The second retardation film 2320 may be spaced apart from the first retardation film 2310. The second retardation film 2320 has an anisotropic refractivity. The second retardation film 2320 changes a phase of the light incident into the second retardation film 2320 so that a phase difference between the X component and the Y component of the light is about $\lambda/2$. Thus, when the linearly polarized light is incident into the second retardation film 2320, a vibration axis of light may be changed. Alternatively, the second retardation film 2320 may change the linearly polarized light into an elliptically polarized light.

A first transparent electrode 2410 and a second transparent electrode 2420 are formed on opposite surfaces of the first and second retardation films 2310 and 2320 so that the first transparent electrode 2410 is spaced apart from the second transparent electrode 2420. For example, the first transparent electrode 2410 is formed on an upper surface of the first retardation film 2310, and the second transparent electrode 2420 is formed on a lower surface of the second retardation film 2320. Examples of a transparent conductive material that can be used for the first and second transparent electrodes 2410 and 2420 include indium tin oxide (ITO), indium zinc oxide (IZO), etc.

A plurality of dot spacers 2450 is formed on the first transparent electrode 2410, and a height of each of the dot spacers 2450 is smaller than a distance between the first and second transparent electrodes 2410 and 2420. In FIG. 12, the dot spacers 2450 are formed on the first transparent electrode 2410. Alternatively, the dot spacers 2450 may be formed on the second transparent electrode 2420.

Insulating adhesives may be interposed between peripheral portions of the first and second transparent electrodes 2410 and 2420 so that the first transparent electrode 2410 is combined with the second transparent electrode 2420, and is spaced apart from the second transparent electrode 2420.

The third and fourth retardation films 2610 and 2620 are interposed between the TFT substrate 2230 and the second polarizer 2720 to change a phase of the light having passed through the second polarizer 2710. For example, the third retardation film 2610 is on a lower surface of the first transparent substrate 2210 of the TFT substrate 2230, and the fourth retardation film 2620 is interposed between the third retardation film 2610 and the second polarizer 2720.

For example, the third retardation film 2610 is a λ/4 phase difference film, and may function as substantially the same function as the first retardation film 2310. In addition, the fourth retardation film 2620 is a λ/2 phase difference film, and may function as substantially the same function as the second retardation film 2320.

Examples of a transparent material that can be used for the first, second, third and fourth retardation films 2310, 2320, 2610 and 2620 include polycarbonate, polyarylate, polyethersulfone, etc.

The first polarizer 2710 is spaced apart from the color filter substrate 2260 on the color filter substrate 2260. For example, the first polarizer 2710 may be formed on the first retardation film 2320. The first polarizer 2710 transmits a portion of light vibrating in a direction substantially in parallel with a polarizing axis of the first polarizer 2710, and blocks a remaining portion of light vibrating in a different direction from the polarizing axis, thereby changing the light into the linearly polarized light.

The second polarizer 2720 is spaced apart from the TFT substrate 2230 under the TFT substrate 2230. For example, the second polarizer 2720 is disposed under the fourth retardation film 2620. The second polarizer 2720 transmits a portion of light vibrating in a direction substantially in parallel with a polarizing axis of the second polarizer 2720, and blocks a remaining portion of light vibrating in a different direction from the polarizing axis. Thus, the light generated from a lighting unit (not shown) that is disposed under the liquid crystal display panel 220 is changed into the linearly polarized light.

For example, the polarizing axis of the first polarizer 2710 may be substantially in perpendicular to the polarizing axis of the second polarizer 2720. Alternatively, the polarizing axis of the first polarizer 2710 may be substantially in parallel with the polarizing axis of the second polarizer 2720. The first and second polarizers 2710 and 2720 may be on an upper surface and a lower surface of the liquid crystal display panel 2200, respectively. A luminance of the light having passed through the liquid crystal display panel 2200 may be changed by an angle formed between the polarizing axis of the first polarizer 2710 and the polarizing axis of the second polarizer 2720.

In FIG. 12, the first and second transparent electrodes 2410 and 2420 are formed on the first and second retardation films 2310 and 2320 so that a thickness of the liquid crystal display apparatus 2100 having the integrally formed touch panel is decreased, and manufacturing cost is also decreased.

In addition, the liquid crystal display panel 2200 may be a transflective liquid crystal display panel. Alternatively, the liquid crystal display panel 2200 may be a reflective liquid crystal display panel, and the third retardation film 2610, the fourth retardation film 2620 and the second polarizer 2720 may be omitted.

Figure 13:
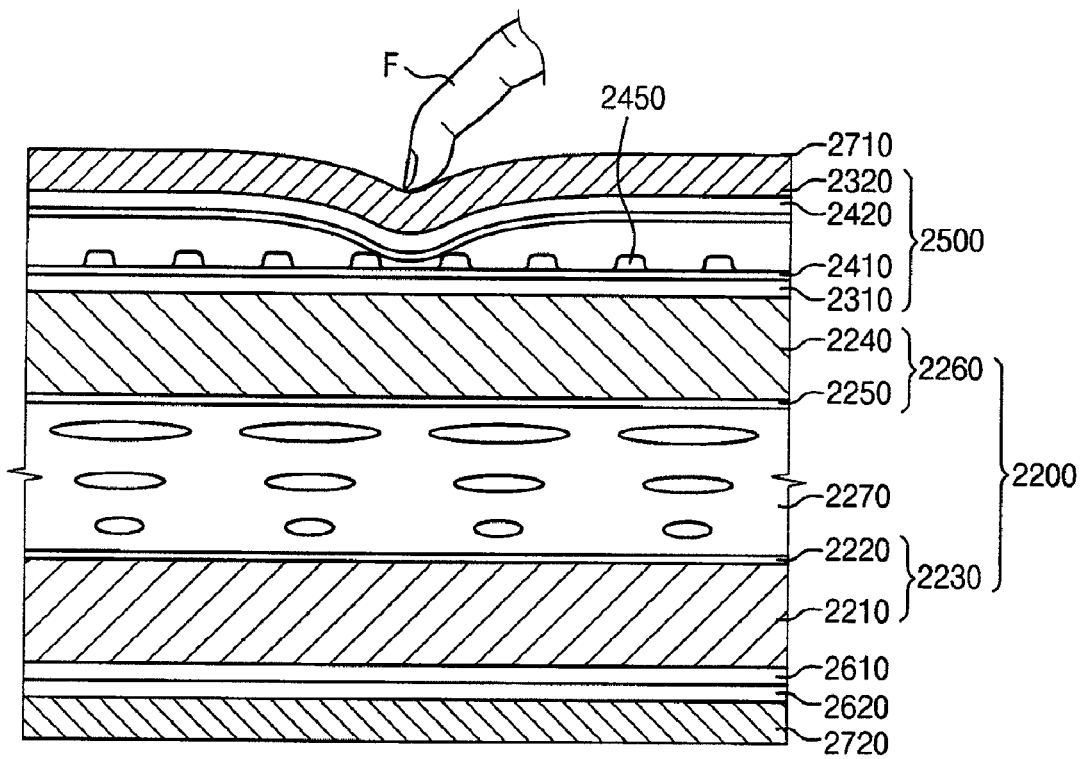
FIG. 13 is a cross sectional view showing operation of the liquid crystal display apparatus of FIG. 12.

FIG. 13 is a cross sectional view showing an operation of the liquid crystal display apparatus of FIG. 12.

Referring to FIGS. 12 and 13, when a finger F touches the liquid crystal display apparatus 2100, the first transparent electrode 2400 is electrically connected to the second transparent electrode 2420.

Each of the first and second transparent electrodes 2410 and 2420 is a conductive electrode having a predetermined resistance. When a current is applied between the first and second transparent electrodes 2410 and 2420, the first and second transparent electrodes 2410 and 2420 have a linear voltage distribution. Therefore, the voltage difference between the first and second transparent electrodes 2410 and 2420 that are electrically connected to each other is detected to determine a position of the finger F of a user.

The dot spacers 2450 are formed on the first transparent electrode 2410, and are spaced apart from each other by a constant distance. For example, a height of each of the dot spacers 2450 is smaller than the distance between the first and second transparent electrodes 2410 and 2420.

When the first transparent electrode 2410 makes contact with the second transparent electrode 2420 by the finger F, the dot spacers 2450 buffer an impact applied between the first and second transparent electrodes 2410 and 2420 by the finger F. In addition, when the finger F is removed from the liquid crystal display apparatus, the second transparent electrode 2420 recovers original position by the dot spacers 2450 so that the second transparent electrode 2420 is spaced apart from the first transparent electrode 2410. For example, the dot spacers 2450 have elasticity, and transmits light so that the light having passed through the first transparent electrode 2410 may pass through the dot spacers 2450.

In FIG. 13, the dot spacers 2450 are formed on the upper surface of the first transparent electrode 2410. Alternatively, the dot spacers 2450 may be formed on the lower surface of the second transparent electrode 2420.

For example, the dot spacers 2450 may be protruded from the first transparent electrode 2410. Each of the dot spacers 2450 may have a circular columnar shape or an elliptical columnar shape.

In addition, a lower portion of each of the dot spacers 2450 making contact with the first transparent electrode 2410 may have a greater cross sectional area than an upper portion of each of the dot spacers 2450. For example, a height of each of the dot spacers 2450 may be from about 2 μm to about 10 μm, and a width of the lower portion of each of the dot spacers 2450 may be from about 10 μm to about 80 μm.

The liquid crystal display apparatus 2100 may be pushed by the finger F as shown in FIG. 13 for tens of thousands times to hundreds of thousands times during a lifetime of the liquid crystal display apparatus 2100. A hard coating layer may be coated on the first polarizer 2710 to protect the first polarizer 2710 from being pushed by the finger F. For example, the hard coating layer may include polyacryl. In addition, an anti reflection layer may be formed on the first polarizer 2710 or the hard coating layer to decrease reflection of light that is irradiated onto an upper surface of the liquid crystal display apparatus 2100.

Figure 14:
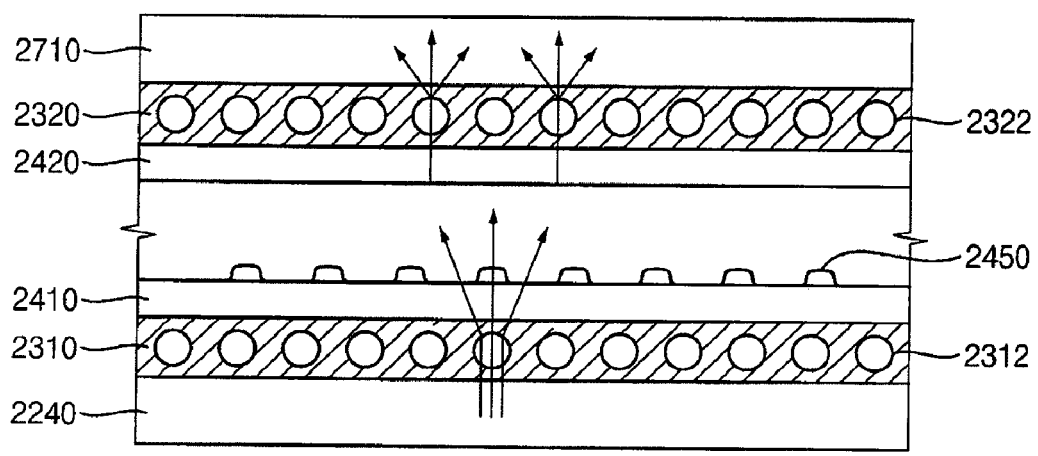
FIG. 14 is an enlarged cross sectional view showing another exemplary touch panel of the liquid crystal display apparatus of FIG. 12.

FIG. 14 is an enlarged cross sectional view showing another exemplary touch panel of the liquid crystal display apparatus of FIG. 12.

The touch panel of FIG. 14 is same as in FIG. 12 except for a first retardation film and a second retardation film. Thus, the same reference numerals will be used to refer to the same or like parts as those described in FIG. 12, and any further explanation concerning the above elements will be omitted.

Referring to FIG. 14, the touch panel 2500 includes a first retardation film 2310, a second retardation film 2320 and a plurality of dot spacers 2450. A first transparent electrode 2410 is formed on the first retardation film 2310. A second transparent electrode 2420 is formed on the second retardation film 2320. The dot spacers 2450 are formed between the first and second transparent electrodes 2410 and 2420.

At least one of the first and second retardation films 2310 and 2320 may include a plurality of scattering particles. For example, the first retardation film 2310 includes a plurality of first scattering particles 2312, and the second retardation film 2320 includes a plurality of second scattering particles 2322. The first and second scattering particles 2312 and 2322 diffuse and scatter light incident into the first and second retardation films 2310 and 2320 to increase luminance uniformity. For example, the first and second scattering particles 2312 and 2322 may be formed through a polymer blending method so that the first and second scattering particles 2312 and 2322 are formed in the first and second retardation films 2310 and 2329 and are distributed in a random arrangement.

Each of the first and second scattering particles 2312 and 2322 may have a substantially circular cross section or a substantially elliptical cross section. Thus, each of the first and second scattering particles 2312 and 2322 may scatter the light in various directions.

For example, the first and second scattering particles 2312 and 2322 may have various refractive indexes so that the first and second retardation films 2310 and 2320 may have a haze value of more than a predetermined value. Examples of a transparent material that can be used for the first and second scattering particles 2312 and 2322 include silica, acrylate, polyarylate, etc. Alternatively, each of the first and second scattering particles 2312 and 2322 may include an air bubble.

Therefore, the first and second retardation films 2310 and 2320 may include the first and second scattering particles 2312 and 2322 having various refractive indexes so that the haze value of the first and second retardation films 2310 and 2320 is increased although a density of the first and second scattering particles 2312 and 2322 is decreased.

In FIG. 14, a diameter of each of the first and second scattering particles 2312 and 2322 may be from several nanometers to a thickness of each of the first and second retardation films 2310 and 2320. For example, the diameter of each of the first and second scattering particles 2312 and 2322 may be from about 0.01 μm to about 200 μm. The first and second scattering particles 2312 and 2322 may have substantially the same size. Alternatively, the first and second scattering particles 2312 and 2322 may have various sizes.

A summation of volume of the first scattering particles 2312 may be about 10% to about 80% of a total volume of the first retardation film 2310, and a summation of volume of the second scattering particles 2322 may be about 10% to about 80% of a total volume of the second retardation film 2320. For example, a summation of volume of the first and second scattering particles 2312 and 2322 may be abut 10% to about 80% of a total volume of the first and second retardation films 2310 and 2320.

An amount of the second scattering particles 2122 in the second retardation film 2320 may be greater than that of the first scattering particles 2312 in the first retardation film 2310 in decrease effulgence of an externally provided light on a surface of the liquid crystal display apparatus 2100. For example, the summation of the volume of the first scattering particles 2312 may be about 10% of the total volume of the first retardation film 2310, and the summation of the volume of the second scattering particles 2322 may be about 70% of the total volume of the second retardation film 2320.

Figure 15:
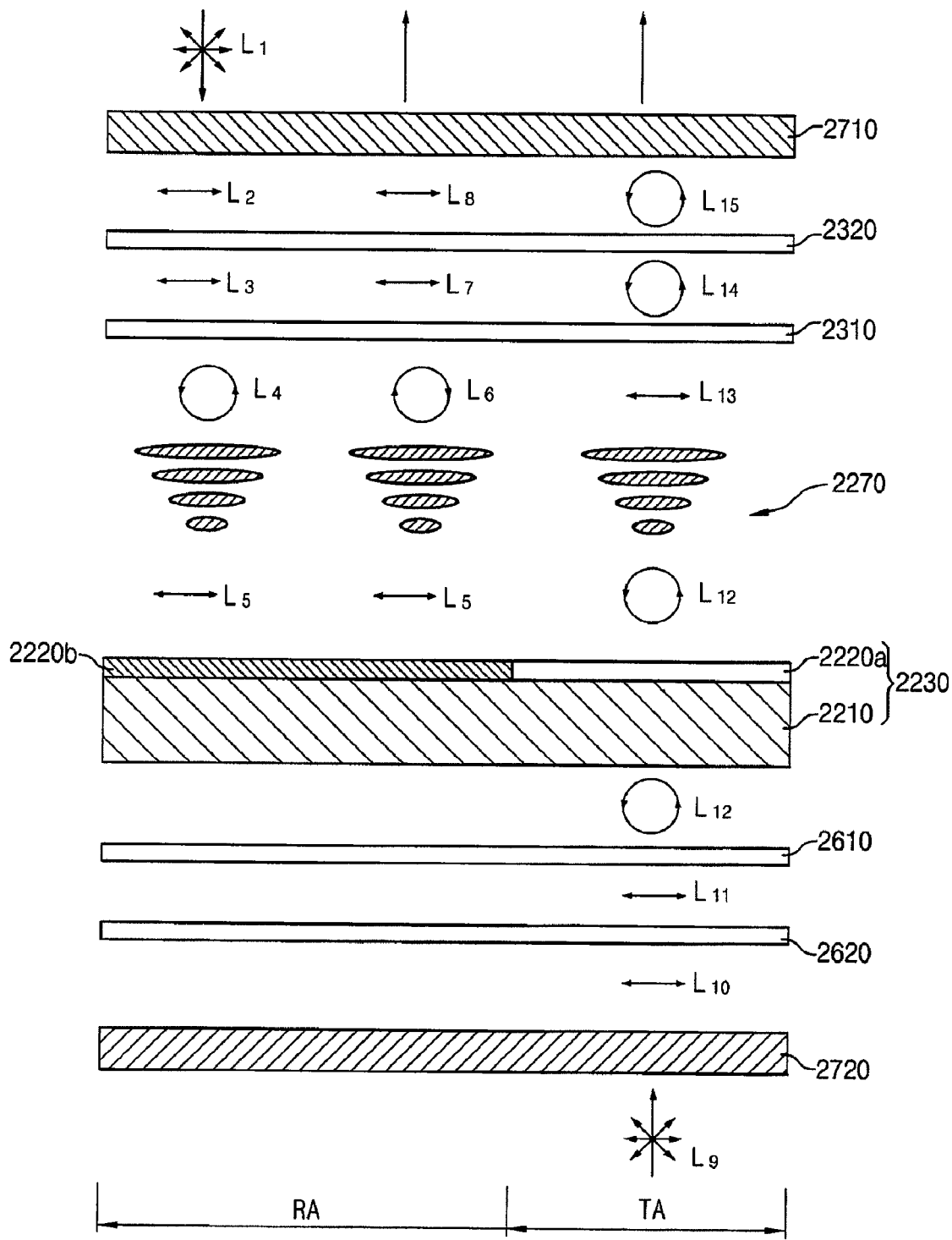
FIG. 15 is a cross sectional view showing optical characteristics of the liquid crystal display apparatus of FIG. 12.

FIG. 15 is a cross sectional view showing optical characteristics of the liquid crystal display apparatus of FIG. 12. Optical characteristics of a transflective liquid crystal display apparatus is illustrated in FIG. 15.

Referring to FIG. 15, a liquid crystal layer 2270 of the liquid crystal display apparatus 2100 includes twisted nematic liquid crystals, and has a normally white mode. An upper portion of liquid crystal layer 2270 including the twisted nematic liquid crystals forms about 90 degree with respect to a lower portion of the liquid crystal layer 2270 including the twisted nematic liquid crystals. For example, when an electric field is not applied to the liquid crystal layer 2270, the liquid crystal display apparatus 2100 transmits light. However, when the electric field is applied to the liquid crystal layer 2270, the liquid crystal display apparatus 2100 blocks the light.

The liquid crystal display apparatus 2100 includes a reflection region RA and a transmission region TA based on a method of light supplication.

Hereinafter, the reflection region RA of the liquid crystal display apparatus 2100 will be described.

An external light L1 is provided from an exterior to the liquid crystal display apparatus 2100. The external light L1 passes through a first polarizer 2710 to be changed into a first linearly polarized light L2 that vibrates in a polarizing axis of the first polarizer 2710. The first linearly polarized light L2 passes through a second retardation film 2320 that is a λ/2 phase difference film to be changed into a second linearly polarized light L3. The second linearly polarized light L3 passes through a first retardation film 2310 that is a λ/4 phase difference film to be changed into a first circularly polarized light L4. The first circularly polarized light L4 may be a right circularly polarized light or a left circularly polarized light.

The first circularly polarized light L5 passes through the liquid crystal layer 2270 to be changed into a third linearly polarized light L5. When the electric field is not applied to the liquid crystal layer 2270, the liquid crystals of the liquid crystal layer 2270 is twisted by about 90 degree. The third linearly polarized light L5 is reflected from a reflection member 2220b formed on a TFT substrate 2230. The reflected third linearly polarized light L5 passes through the liquid crystal layer 2270 to be changed into a second circularly polarized light L6.

The second polarized light L6 passes through the first retardation film 2310 to be changed into a fourth linearly polarized light L7. The fourth linearly polarized light L7 passes through the second retardation film 2320 to be changed into a fifth linearly polarized light L8. The fifth linearly polarized light L8 vibrates in a direction substantially in parallel with the polarizing axis of the first polarizer 2710 so that the fifth linearly polarized light L8 passes through the first polarizer 2710.

An internal light L9 passes through the transmission region TA. The liquid crystal display apparatus 2100 may further include a backlight assembly (not shown) that generates the internal light toward the liquid crystal display panel 2200.

The internal light L9 generated from the backlight assembly is incident into the second polarizer 2720. The internal light L9 passes through the second polarizer 2720 to be changed into a sixth linearly polarized light L10 the vibrates in a direction substantially in parallel with a polarizing axis of the second polarizer 2720. The sixth linearly polarized light L10 passes through a fourth retardation film 2620 to be changed into a seventh linearly polarized light L11. The seventh linearly polarized light L11 passes through a third retardation film 2610 to be changed into a third circularly polarized light L12. The third circularly polarized light L12 may be a right circularly polarized light or a left circularly polarized light.

The third circularly polarized light L12 passes through the liquid crystal layer 2270 to be changed into an eighth circularly polarized light L13. The eighth linearly polarized light L13 passes through the first retardation film 2310 that is the λ/4 phase difference film to be changed into a fourth circularly polarized light L14. The fourth circularly polarized light L14 passes through the second retardation film 2320 that is the λ/2 phase difference film to be changed into a fifth circularly polarized light L15. A portion of the fifth circularly polarized light L15 vibrating in the direction substantially in parallel with the polarizing axis of the second polarizer 2350 passes through the second retardation film 2710.

Figure 16:
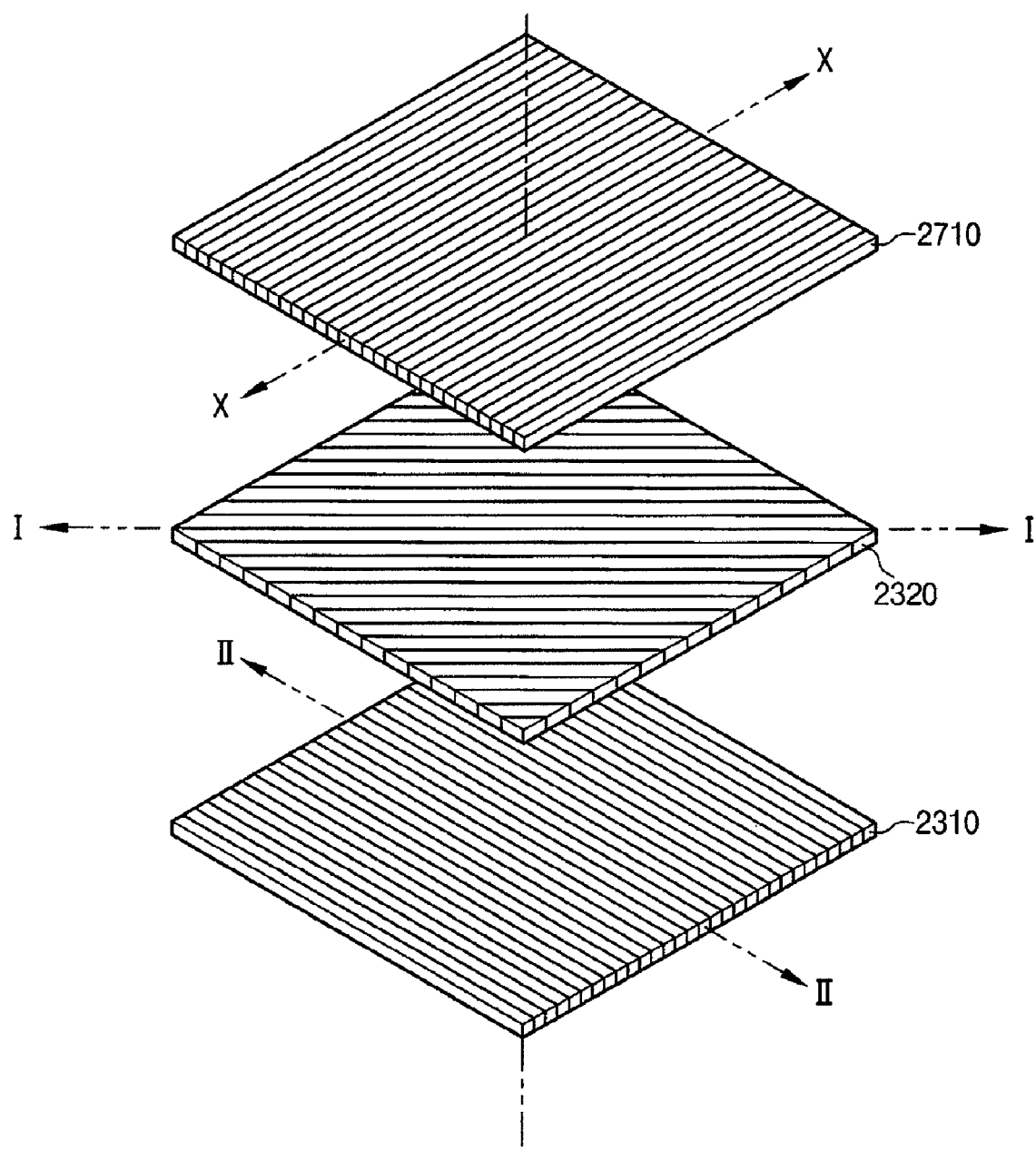
FIG. 16 is a perspective view showing a first retardation film, a second retardation film and a first polarizer shown in FIG. 15.

FIG. 16 is a perspective view showing a first retardation film, a second retardation film and a first polarizer shown in FIG. 15.

Referring to FIG. 16, an arrangement of the first retardation film 2310, the second retardation film 2320 and the first polarizer 2710 is adjusted to improve optical characteristics of the liquid crystal display apparatus.

The polarizing axis of the first polarizer 2710 is represented by X axis. A longitudinal axis of the second retardation film 2320 is represented by I axis. A longitudinal axis of the first retardation film 2310 is represented by II axis.

The second retardation film 2320 is disposed under the first polarizer 2710. The I axis of the second retardation film 2320 forms an angle of about 45 degree to about 135 degree with respect to the X axis of the first polarizer 2710. For example, the I axis of the second retardation film 2320 may form an angle of about 45 degree or about 135 degree with respect to the X axis of the first polarizer 2710. The first retardation film 2310 is disposed under the second retardation film 2320. The II axis of the first retardation film 2310 forms an angle of about 90 degree to about 180 degree with respect to the X axis of the first polarizer 2710. For example, the II axis of the first retardation film 2310 may form an angle of about 90 degree or about 180 degree with respect to the X axis of the first polarizer 2710.

The third retardation film 2610, the fourth retardation film 2620 and the second polarizer 2720 shown in FIG. 15 may also be disposed in substantially the same arrangement as the first retardation film 2310, the second retardation film 2320 and the first polarizer 2710 show in FIG. 16.

This invention has been described with reference to the exemplary embodiments. It is evident, however, that many alternative modifications and variations will be apparent to those having kill in the art in light of the foregoing description. Accordingly, the present invention embraces all such alternative modifications and variations as fall within the spirit and scope of the appended claims.

What is claimed is:

1. A liquid crystal display apparatus comprising:
   a liquid crystal panel including a color filter substrate, a thin film transistor substrate and a liquid crystal interposed between the color filter substrate and the thin film transistor substrate; and
   a touch panel on the color filter substrate, the touch panel including a first retardation film having a first transparent electrode and a second retardation film having a second transparent electrode spaced apart from the first transparent electrode and making contact with the first transparent electrode by an externally provided pressure to generate a position information of the pressure,
   wherein a plurality of scattering parts are disposed inside at least one of the first and second retardation films.

2. The liquid crystal display apparatus of claim 1, wherein the first retardation film comprises a plurality of first scattering parts, and the second retardation film comprises a plurality of second scattering parts.

3. The liquid crystal display apparatus of claim 2, wherein a size of each of the first and second scattering parts is from about 0.01 μm to about 200 μm.

4. The liquid crystal display apparatus of claim 2, wherein a summation of volume of the first scattering parts is about 10% to about 80% of a total volume of the first retardation film, and a summation of volume of the second scattering parts is about 10% to about 80% of a total volume of the second retardation film.

5. The liquid crystal display apparatus of claim 4, wherein a summation of volume of the first and second scattering parts is about 10% to about 80% of a total volume of the first and second retardation films.

6. The liquid crystal display apparatus of claim 2, wherein each of the first and second scattering parts comprise polyarylate.

7. The liquid crystal display apparatus of claim 2, wherein each of the first and second scattering parts comprises an air bubble.

8. The liquid crystal display apparatus of claim 1, further comprising:
   a third retardation film disposed under the thin film transistor substrate; and
   a fourth retardation film disposed under the third retardation film.

9. The liquid crystal display apparatus of claim 8, further comprising:
   a first polarizer disposed on the second retardation film; and
   a second polarizer disposed under the fourth retardation film.

10. The liquid crystal display apparatus of claim 9, wherein each of the first and third retardation films comprises a λ/4 retardation film, and each of the second and fourth retardation films comprises a λ/2 retardation film.

11. The liquid crystal display apparatus of claim 1, further comprising a plurality of dot spacers formed on one of corresponding surfaces of the first and second transparent electrodes.

12. The liquid crystal display apparatus of claim 1, wherein the plurality of scattering parts are disposed at scattering sites distributed in the at least one of the first and second retardation films.

13. A liquid crystal display apparatus comprising:
   a liquid crystal panel including a color filter substrate, a thin film transistor substrate and a liquid crystal interposed between the color filter substrate and the thin film transistor substrate; and
   a touch panel on the color filter substrate, the touch panel including a first retardation film, a first transparent electrode on a surface of the first retardation film, a second retardation film and a second transparent electrode formed on the second retardation film, the second transparent electrode being spaced apart from the first transparent electrode and making contact with the first transparent electrode by an externally provided pressure to generate a position information of the pressure,
   wherein the first retardation film and the second retardation film comprise a plurality of first scattering parts.

* * * * *

UNITED STATES PATENT AND TRADEMARK OFFICE
CERTIFICATE OF CORRECTION

PATENT NO. : 7,583,326 B2  
APPLICATION NO. : 11/774345  
DATED : September 1, 2009  
INVENTOR(S) : Jong-Whan Cho et al.

Page 1 of 1

It is certified that error appears in the above-identified patent and that said Letters Patent is hereby corrected as shown below:

Title Page

Add item

"(63) Related U.S. Application Data

Continuation-in-Part of Application No. 10/525,060 filed on Feb. 18, 2005, now Pat. No. 7,405,774"

In item

(30) Foreign Application Priority Data

Add  "Aug. 20, 2002 (KR)................................10-2002-0049272

Aug. 20, 2002 (KR)................................10-2002-0049273

Nov. 5, 2002 (KR)................................10-2002-0068250"

Signed and Sealed this

Tenth Day of November, 2009

David J. Kappos  
*Director of the United States Patent and Trademark Office*